US009686634B2

(12) United States Patent
Sun

(10) Patent No.: US 9,686,634 B2
(45) Date of Patent: Jun. 20, 2017

(54) MACHINE-TO-MACHINE (M2M) ORIENTED SERVICE PLATFORM INTERFACE APPARATUS AND METHOD

(71) Applicant: ZTE Corporation, Shenzhen (CN)

(72) Inventor: Aifang Sun, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/912,208

(22) PCT Filed: Nov. 19, 2013

(86) PCT No.: PCT/CN2013/087437
§ 371 (c)(1),
(2) Date: Feb. 16, 2016

(87) PCT Pub. No.: WO2014/161318
PCT Pub. Date: Oct. 9, 2014

(65) Prior Publication Data

US 2016/0205494 A1 Jul. 14, 2016

(30) Foreign Application Priority Data

Aug. 20, 2013 (CN) .......................... 2013 1 0363256

(51) Int. Cl.
*G06F 15/16* (2006.01)
*G06F 15/177* (2006.01)
(Continued)

(52) U.S. Cl.
CPC ......... *H04W 4/005* (2013.01); *H04L 67/2838* (2013.01); *H04W 4/006* (2013.01);
(Continued)

(58) Field of Classification Search
CPC ..... H04L 43/50; H04L 12/58; H04L 12/2697; H04L 12/24; H04L 12/66; H04L 51/32;
(Continued)

(56) References Cited

U.S. PATENT DOCUMENTS

2011/0213871 A1* 9/2011 DiGirolamo ............ H04W 4/00 709/223
2012/0252481 A1* 10/2012 Anpat ..................... H04W 8/06 455/456.1

(Continued)

FOREIGN PATENT DOCUMENTS

CN 102045870 A 5/2011
CN 102136933 A 7/2011

(Continued)

OTHER PUBLICATIONS

International Search Report in international application No. PCT/CN2013/087437, mailed on May 5, 2014.

(Continued)

*Primary Examiner* — Farzana Huq
(74) *Attorney, Agent, or Firm* — Oppedahl Patent Law Firm LLC

(57) ABSTRACT

Disclosed are an M2M oriented service platform interface apparatus and method. The apparatus includes: a coordinated service management module, configured to forward service data and a service request, perform management, adaptation, and provision on service data, and perform coordinated management on a service according to a service request of an application server; a context management and provision module, configured to manage and provide context information; a stream transmission and service adaptation module, configured to perform a traffic distribution operation on a service according to a user service type and context information, adapt the service to different M2M terminal equipment and networks, provide service data that a user needs, and perform corresponding service adaptation upon different user demands; and a joint wireless resource management module, configured to perform scheduling and adaptation on a wireless resource carried by an M2M terminal equipment, and perform adaptation and scheduling (Continued)

on the wireless resource according to service context information, context information of the M2M terminal equipment, and a network load, so as to complete transmission and information interaction of a service stream.

8 Claims, 5 Drawing Sheets

(51) Int. Cl.
*G06F 15/173* (2006.01)
*H04W 4/00* (2009.01)
*H04W 72/12* (2009.01)
*H04L 29/08* (2006.01)

(52) U.S. Cl.
CPC ..... *H04W 72/1205* (2013.01); *H04L 67/2819* (2013.01); *H04L 67/2823* (2013.01); *H04L 67/303* (2013.01)

(58) Field of Classification Search
CPC ..... H04L 47/10; H04L 41/042; H04L 41/046; H04L 41/0226; H04L 41/0677; H04L 41/082; H04L 41/0816; H04L 41/0856; H04L 41/0846; H04L 67/12; H04L 67/1002; H04L 67/1034
USPC ................ 709/202, 220, 223, 224, 226, 229
See application file for complete search history.

(56) References Cited

U.S. PATENT DOCUMENTS

2012/0281658 A1* 11/2012 Rikkinen .............. H04W 88/04 370/329
2012/0290702 A1 11/2012 Vincent
2012/0327945 A1 12/2012 Li
2013/0013555 A1* 1/2013 Foti ......................... H04W 4/08 707/609
2013/0013793 A1* 1/2013 Sanchez Herrero .... H04W 8/04 709/227
2013/0041997 A1 2/2013 Li et al.
2013/0070710 A1* 3/2013 Guo ...................... H04W 4/005 370/329
2013/0219064 A1 8/2013 Zhang et al.
2014/0045452 A1* 2/2014 Ma ........................ H04W 4/005 455/406
2014/0349660 A1* 11/2014 Abdalla ................ H04W 4/005 455/450

FOREIGN PATENT DOCUMENTS

CN 102170611 A 8/2011
CN 102238573 A 11/2011
CN 102752877 A 10/2012
EP 2536100 A1 12/2012

OTHER PUBLICATIONS

English Translation of the Written Opinion of the International Search Authority in international application No. PCT/CN2013/087437, mailed on May 5, 2014.
Supplementary European Search Report in European application No. 13881052.8, mailed on Jul. 18, 2016.
"Machine-to-Machine communications (M2M); Functional architecture;Draft ETSI TS 102 690",ETSI Draft; Draft ETSI TS 102 690, European Telecommunications Standards Institute (ETSI), 650, Route Des Lucioles; F-06921 Sophia-Antipolis; France, mailed on Aug. 4, 2010.

* cited by examiner

M2M application layer
101
M2M application server
M2M service capability layer
102
M2M service platform
Em
Ec
Em
Core network
M2M communication network layer
103
3G
2G
Fixed access
WLAN
M2M perception extension layer
104
M2M gateway
M2M terminal
Terminal peripheral
Terminal peripheral

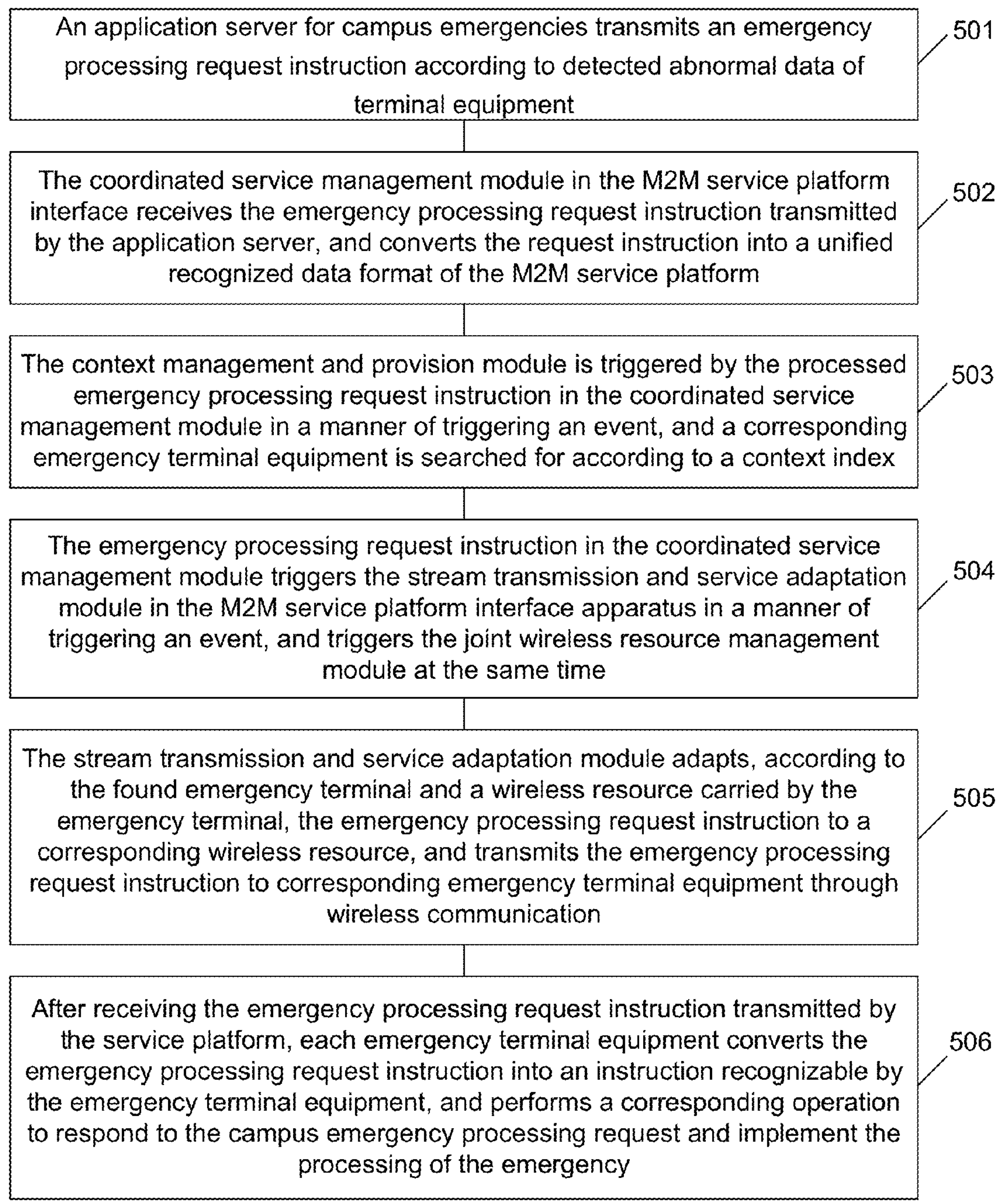
Fig. 5
An application server for campus emergencies transmits an emergency processing request instruction according to detected abnormal data of terminal equipment
501
The coordinated service management module in the M2M service platform interface receives the emergency processing request instruction transmitted by the application server, and converts the request instruction into a unified recognized data format of the M2M service platform
502
The context management and provision module is triggered by the processed emergency processing request instruction in the coordinated service management module in a manner of triggering an event, and a corresponding emergency terminal equipment is searched for according to a context index
503
The emergency processing request instruction in the coordinated service management module triggers the stream transmission and service adaptation module in the M2M service platform interface apparatus in a manner of triggering an event, and triggers the joint wireless resource management module at the same time
504
The stream transmission and service adaptation module adapts, according to the found emergency terminal and a wireless resource carried by the emergency terminal, the emergency processing request instruction to a corresponding wireless resource, and transmits the emergency processing request instruction to corresponding emergency terminal equipment through wireless communication
505
After receiving the emergency processing request instruction transmitted by the service platform, each emergency terminal equipment converts the emergency processing request instruction into an instruction recognizable by the emergency terminal equipment, and performs a corresponding operation to respond to the campus emergency processing request and implement the processing of the emergency
506

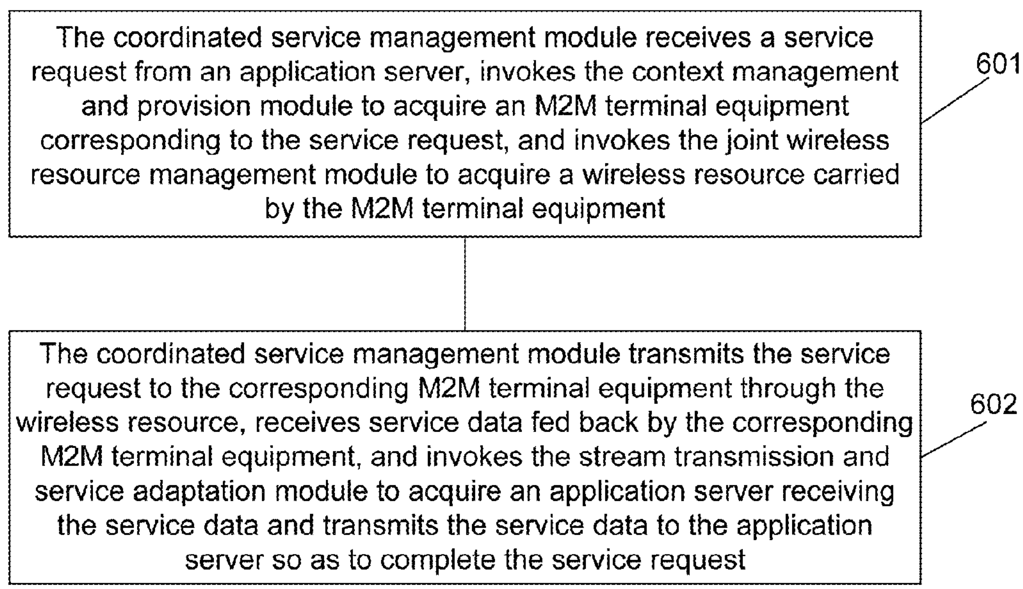
Fig. 6
The coordinated service management module receives a service request from an application server, invokes the context management and provision module to acquire an M2M terminal equipment corresponding to the service request, and invokes the joint wireless resource management module to acquire a wireless resource carried by the M2M terminal equipment
601
The coordinated service management module transmits the service request to the corresponding M2M terminal equipment through the wireless resource, receives service data fed back by the corresponding M2M terminal equipment, and invokes the stream transmission and service adaptation module to acquire an application server receiving the service data and transmits the service data to the application server so as to complete the service request
602

MACHINE-TO-MACHINE (M2M) ORIENTED SERVICE PLATFORM INTERFACE APPARATUS AND METHOD

TECHNICAL FIELD

The present disclosure relates to the field of mobile communications, particularly to a Machine-to-Machine (M2M) oriented service platform interface apparatus and method.

BACKGROUND

FIG. 1 is an architecture diagram of an M2M system in the related art. As shown in FIG. 1, the M2M system includes an M2M application layer 101, an M2M service serving capability layer 102, an M2M communication network layer 103, an M2M perception extension layer 104, wherein the M2M application layer 101 mainly consists of an M2M application server, the M2M service serving capability layer 102 mainly includes an M2M service platform, the M2M communication network layer 103 includes a wireless network and a wired network, such as a $2^{nd}$ Generation (2G) mobile communication network, a $3^{rd}$ Generation (3G) mobile communication network, and a Wireless Local Area Network (WLAN), and the M2M perception extension layer 104 mainly includes an M2M perception extension layer equipment including an M2M terminal node and an M2M terminal, wherein the M2M terminal includes terminal equipment of a certain node of a certain network, such as a sensor network, a personal area network, an office network and a vehicle area network in an M2M network architecture while the M2M terminal node includes certain terminal equipment including an M2M gateway, a cluster head and so on having converging and processing capabilities in the M2M network architecture.

In the M2M system architecture, it is required that the M2M service platform of the M2M service serving capability layer is not only capable of providing some general capabilities and support for the M2M application server to enable the M2M application server to access and use network resources and capabilities, but also the M2M service platform should support response to a service request from the M2M application server and provide configuration information, statistical information, monitoring information and so on of a terminal equipment to the M2M application server. In this way, the M2M service capability layer can perform adaptation to different user terminals in time according to demands of users, or the M2M perception extension layer equipment can adaptively provide services and configuration and statistics of terminal equipment to different M2M application servers, or the M2M application server of the M2M application layer can monitor service data of the M2M perception extension layer equipment and information of terminal equipment in time.

A ubiquitous network, which is being researched and developed at present, is an inevitable trend of the development of the M2M service platform and a necessary condition for further application and popularization of the M2M service platform. With continuous deepening of researches on cloud computing, emerging ubiquitous network technologies and networks, the M2M service platform of the M2M service capability layer satisfying the aforementioned requirements will be a bridge to connect the M2M application layer, the M2M communication network layer and the M2M perception extension layer, and is also a necessary condition of information interaction between a plurality of terminals of a plurality of users and a plurality of M2M application services. Therefore, an M2M oriented service platform interface apparatus is needed urgently so that some general capabilities and support can be provided for the M2M application server to enable the application server to access and use network resources and capabilities, while enabling the M2M service platform to support response to a service request from the M2M application server, and provide configuration information, statistical information, monitoring information and so on of a terminal equipment to the M2M application server.

SUMMARY

Embodiments of the present disclosure provide an M2M oriented service platform interface apparatus and method, so as to provide some general capabilities and support for an M2M application server to enable the M2M application server to access and use network resources and capabilities while enabling an M2M service platform and an M2M application interface to support response to a service request from the M2M application server and provide related information of terminal equipment for the M2M application server.

An embodiment of the present disclosure provides an M2M oriented service platform interface apparatus connected to an application server and connected with M2M terminal equipment by a network. The apparatus includes: a coordinated service management module, configured to forward service data and a service request from the application server and forward service data from the M2M terminal equipment, perform management, adaptation, and provision on service data, and perform coordinated management on a service according to the service request of the application server; a context management and provision module, connected to the coordinated service management module and configured to, under the control of the coordinated service management module, manage and provide network context information, M2M terminal equipment context information and user context information; a stream transmission and service adaptation module, connected to the coordinated service management module and configured to, under the control of the coordinated service management module, perform a traffic distribution operation on the service according to a user service type, the user context information, the network context information, and/or the M2M terminal equipment context information, adapt the service to different M2M terminal equipment and networks, provide service data that a user needs, and perform corresponding service adaptation upon different user demands; and a joint wireless resource management module, connected to the coordinated service management module and configured to, under the control of the coordinated service management module, perform unified scheduling and adaptation on wireless resources carried by the M2M terminal equipment, store and update location information of the M2M terminal equipment, and perform adaptation and scheduling on the wireless resources according to service context information, the M2M terminal equipment context information, and network loads, so as to complete transmission and information interaction of a service stream.

Preferably, the apparatus may further include: an M2M terminal management module, configured to manage the M2M terminal equipment in a unified manner.

Preferably, the M2M terminal management module may be configured to perform remote software upgrading, maintenance, and group management on the M2M terminal equipment, and perform management of group updating caused by mobility of the M2M terminal equipment.

Preferably, the coordinated service management module may be configured to convert the received service data and the service request into a data format recognizable by a service platform.

Preferably, the coordinated service management module may be configured to drive, according to the service request of the application server, a corresponding module in the service platform interface apparatus by triggering an event, so as to perform coordinated management on the service.

An embodiment of the present disclosure further provides an M2M oriented service platform interface method, applied to the M2M oriented service platform interface apparatus, and including that: a coordinated service management module receives a service request from an application server, invokes a context management and provision module to acquire M2M terminal equipment corresponding to the service request, and invokes a joint wireless resource management module to acquire a wireless resource carried by the M2M terminal equipment; the coordinated service management module transmits the service request to the corresponding M2M terminal equipment through the wireless resource, receives service data fed back by the corresponding M2M terminal equipment, and invokes a stream transmission and service adaptation module to acquire an application server receiving the service data and transmits the service data to the application server so as to complete the service request.

Preferably, the method may further include that: the coordinated service management module manages the M2M terminal equipment in a unified manner by invoking an M2M terminal management module.

Preferably, the step that the M2M terminal management module manages the M2M terminal equipment in the unified manner may include that: the M2M terminal management module performs remote software upgrading, maintenance, and group management on the M2M terminal equipment, and performs management of group updating caused by mobility of the M2M terminal equipment.

Preferably, the step that the coordinated service management module transmits the service request to the corresponding M2M terminal equipment through the wireless resource may include that: the coordinated service management module invokes the stream transmission and service adaptation module to adapt the service request to a corresponding wireless resource according to the corresponding M2M terminal equipment and the wireless resource carried by the M2M terminal equipment, and transmits the service request to the corresponding M2M terminal equipment through the wireless resource.

Preferably, the method may further include that the coordinated service management module converts the received service data and the service request into a data format recognizable by a service platform.

The embodiments of the present disclosure have the following beneficial effect:

a service platform interface apparatus of the embodiments of the present disclosure can provide some general capabilities and support for an M2M application server to enable the M2M application server to access and use network resources and capabilities, while enabling an M2M service platform and an M2M application interface to support response to a service request from the M2M application server, and provide configuration information, statistical information, monitoring information and so on of terminal equipment to the M2M application server.

The description above only summarizes the technical solution of the present disclosure, specific embodiments of the present disclosure will be illustrated in particular so that the technical means of the present disclosure can be understood more clearly and thus can be implemented according to the content of the specification, and so that the aforementioned purposes and other purposes, features and advantages of the present disclosure can be more obvious and understood more easily.

BRIEF DESCRIPTION OF THE DRAWINGS

Various other advantages and benefits will become clear for those of ordinary skill in the art by reading the detailed description of the following preferred embodiments. The accompanying drawings are only used for illustrating the purposes of the preferred embodiments, but should not be regarded as limitation to the present disclosure, and the same components are represented by the same reference numbers in all accompanying drawings. In the accompanying drawings:

FIG. 5 is a schematic diagram of a processing flow of the second example according to an embodiment of the present disclosure; and FIG. 6 is a flowchart of an M2M oriented service platform interface method according to an embodiment of the present disclosure.

DETAILED DESCRIPTION

Exemplary embodiments of the present disclosure will be described in more details hereinafter with reference to the accompanying drawings. Although the exemplary embodiments have been shown in the accompanying drawings, it should be understood that the present disclosure may be implemented in various forms, but should not limited by the embodiments elaborated here. On the contrary, these embodiments are provided so that the present disclosure can be understood more thoroughly, and the scope of the present disclosure can be perfectly conveyed to those skilled in the art.

The embodiments of the present disclosure provide an M2M oriented service platform interface apparatus and method, so as to provide some general capabilities and support to an M2M application server so that the M2M application server can access and use network resources and capabilities, and in the meanwhile, an M2M service platform and an M2M application interface can support a service request from the M2M application server and provide configuration information, statistical information, monitoring information and so on of terminal equipment to the M2M application server. The embodiments of the present disclosure will be described in more details below with reference to the accompanying drawings and embodiments. It should be understood that the specific embodiments described herein are only used for explaining the technical solution of the present disclosure, but do not limit the protection scope of the present disclosure.

Apparatus Embodiment

Figure 1:
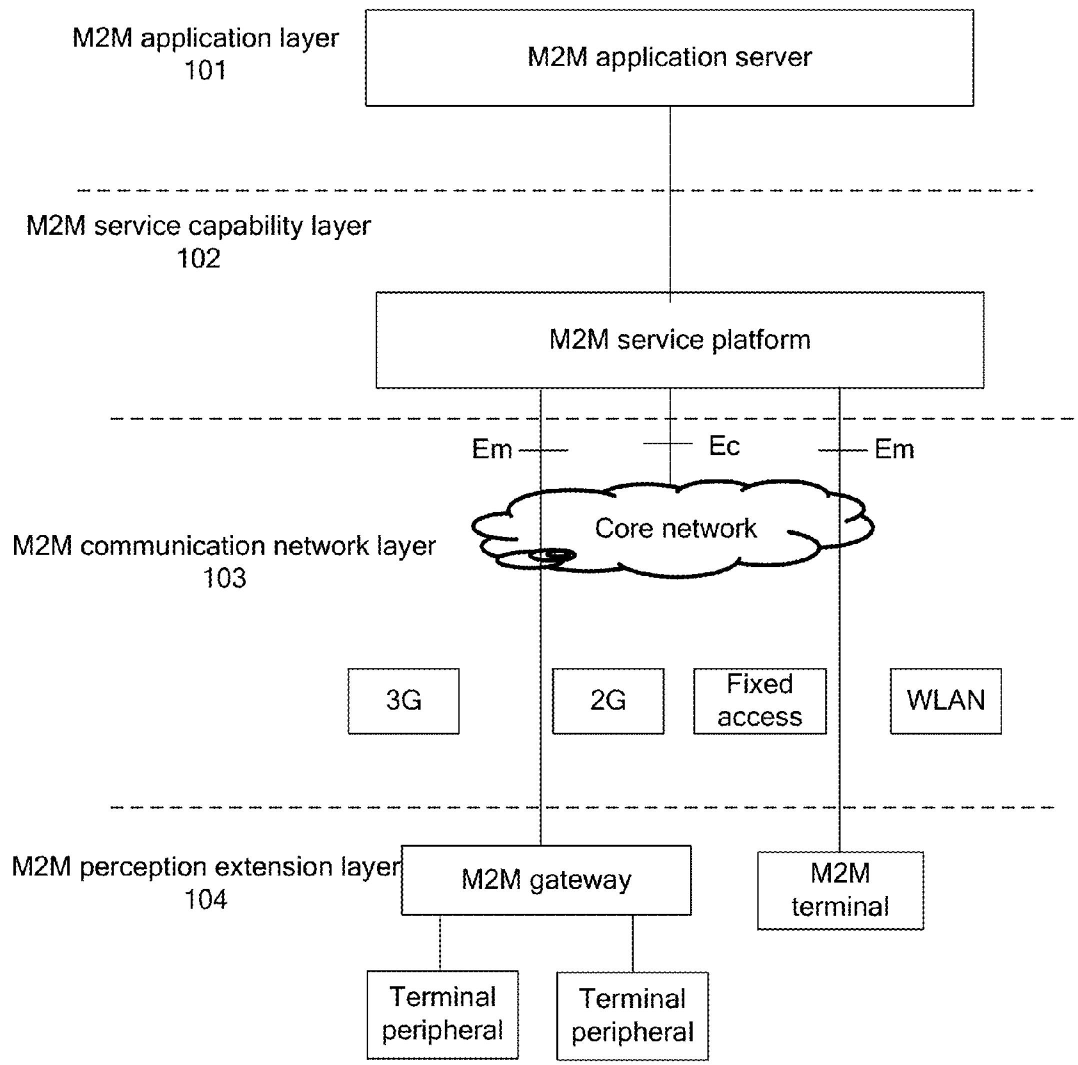
FIG. 1 is an architecture diagram of an M2M system in the related art.
Figure 2:
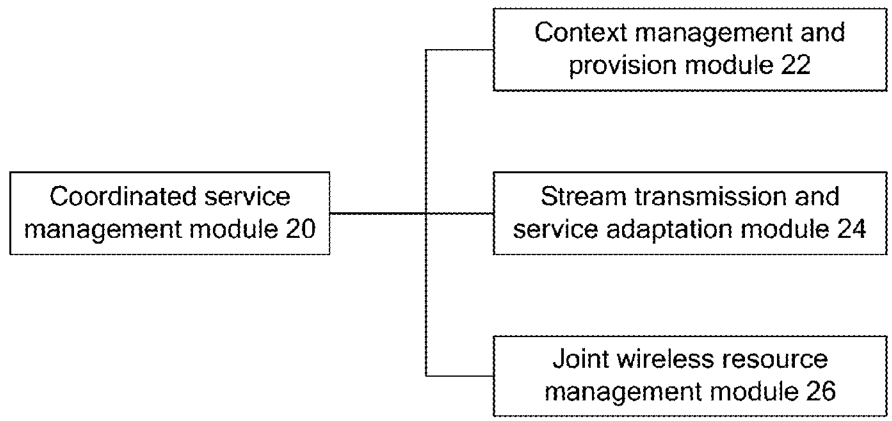
FIG. 2 is a structural diagram of an M2M oriented service platform interface apparatus according to an embodiment of the present disclosure.

An M2M oriented service platform interface apparatus is provided according to an embodiment of the present disclosure. FIG. 2 is a structural diagram of an M2M oriented service platform interface apparatus according to an embodiment of the present disclosure. As shown in FIG. 2, the M2M oriented service platform interface apparatus according to embodiment of the present disclosure is connected to an application server an connected with M2M terminal equipment by a network, and includes: a coordinated service management module 20, a context management and provision module 22, a stream transmission and service adaptation module 24 and a joint wireless resource management module 26. The modules of the embodiment of the present disclosure will be expounded below.

The coordinated service management module 20 is configured to forward service data and a service request from the application server and forward service data from the M2M terminal equipment, perform management, adaptation, and provision on service data, and perform coordinated management on a service according to the service request of the application server.

Preferably, in the embodiment of the present disclosure, the coordinated service management module 20 needs to convert the received service data and the service request into a data format recognizable by a service platform. Besides, the coordinated service management module 20 may drive, according to the service request of the application server, a corresponding module in the service platform interface apparatus by triggering an event, so as to perform coordinated management on the service.

The context management and provision module 22 is connected to the coordinated service management module 20 and configured to, under the control of the coordinated service management module, manage and provide network context information, M2M terminal equipment context information and user context information.

The stream transmission and service adaptation module 24 is connected to the coordinated service management module 20 and configured to, under the control of the coordinated service management module, perform a traffic distribution operation on the service according to a user service type, the user context information, the network context information, and/or the M2M terminal equipment context information, adapt the service to different M2M terminal equipment and networks, provide service data that a user needs, and perform corresponding service adaptation upon different user demands.

The joint wireless resource management module 26 is connected to the coordinated service management module 20 and configured to, under the control of the coordinated service management module, perform unified scheduling and adaptation on wireless resources carried by the M2M terminal equipment, store and update location information of the M2M terminal equipment, and perform adaptation and scheduling on the wireless resources according to service context information, the M2M terminal equipment context information, and network loads, so as to complete transmission and information interaction of a service stream.

Preferably, the apparatus according to the embodiment of the present disclosure may further include: an M2M terminal management module, configured to manage the M2M terminal equipment in a unified manner. For example, the M2M terminal management module is configured to perform remote software upgrading, maintenance, and group management on the M2M terminal equipment, and management of group updating caused by mobility of the M2M terminal equipment.

The aforementioned technical solution of the embodiment of the present disclosure will be expounded below with reference to the accompanying drawings.

Figure 3:
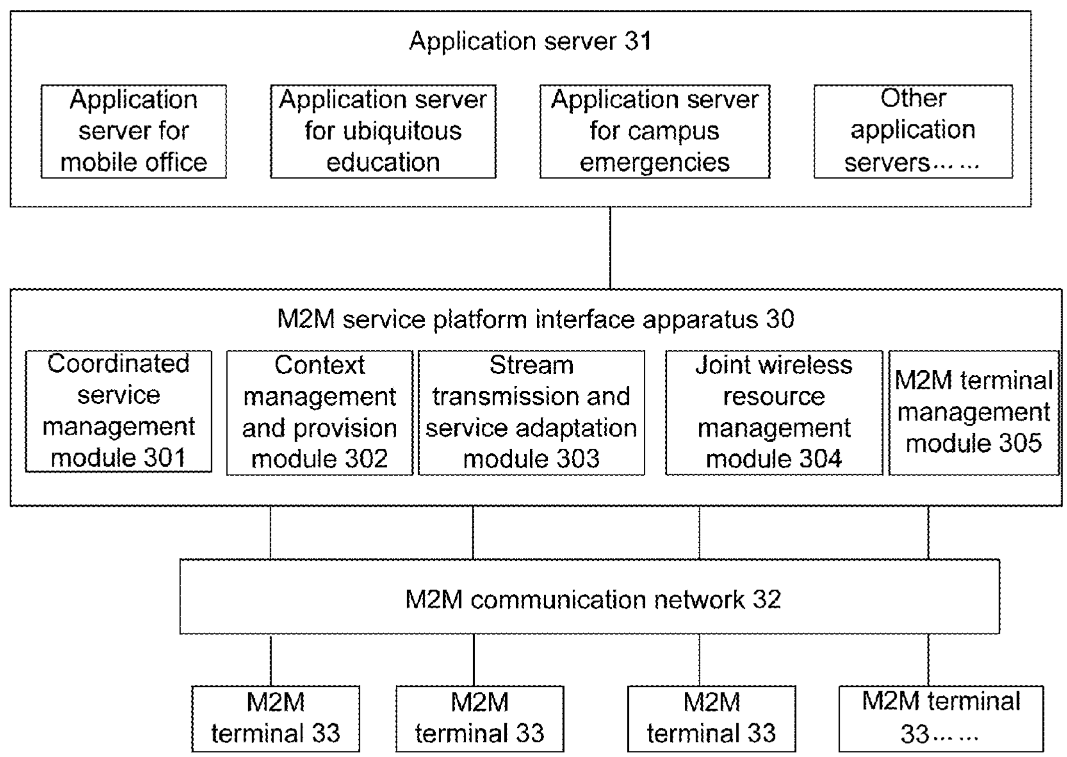
FIG. 3 is a detailed architecture diagram of an application interface apparatus oriented to an M2M service platform according to an embodiment of the present disclosure.

FIG. 3 is an architecture diagram of an application interface apparatus oriented to an M2M service platform according to an embodiment of the present disclosure. As shown in FIG. 3, the application interface apparatus 30 based on the M2M service platform is externally connected with an application server 31, and connected with an M2M terminal 33 through an M2M communication network 32, wherein the application server 31 may include an application server for mobile office, an application server for ubiquitous education, an application server for campus emergencies and other application servers. The M2M service platform interface apparatus 30 includes: a coordinated service management module 301, a context management and provision module 302, a stream transmission and service adaptation module 303, a joint wireless resource management module 304 and an M2M terminal management module 305. Specifically:

the coordinated service management module 301 is responsible for management, adaptation and provision of service data, and reception and transmission of data and a service request from the application server, and a data service from the M2M terminal equipment; the context management and provision module 302 is responsible for managing network context information, terminal context information and user context information and providing an engine; the stream transmission and service adaptation module 303 performs a traffic distribution operation on a service according a user service type, the user context information, the network context information and the terminal context information, while adapting the service to different terminals and networks, so as to provide service data required by a user; in the meanwhile, the service adaptation module performs corresponding service adaptation upon different user demands; the joint wireless resource management module 304 is responsible for performing, in a unified manner, scheduling and adaptation on wireless resources carried by terminals, in the meanwhile, may update information of the wireless resource management module in time according to mobility and updating of the terminals, and besides, may perform adaptation and scheduling on the wireless resources according to service context information and the terminal context information in combination with network loads, so as to complete transmission and information interaction of a service stream; and the M2M terminal management module 305 is responsible for managing M2M terminal equipment in a unified manner, including, but not limited to remote software upgrading, maintenance, and group management of the terminal equipment, and management of group updating caused by mobility of the terminal equipment, and so on.

The M2M oriented service platform interface apparatus will be described in details below by taking a campus emergency as an embodiment.

Example 1

Figure 4:
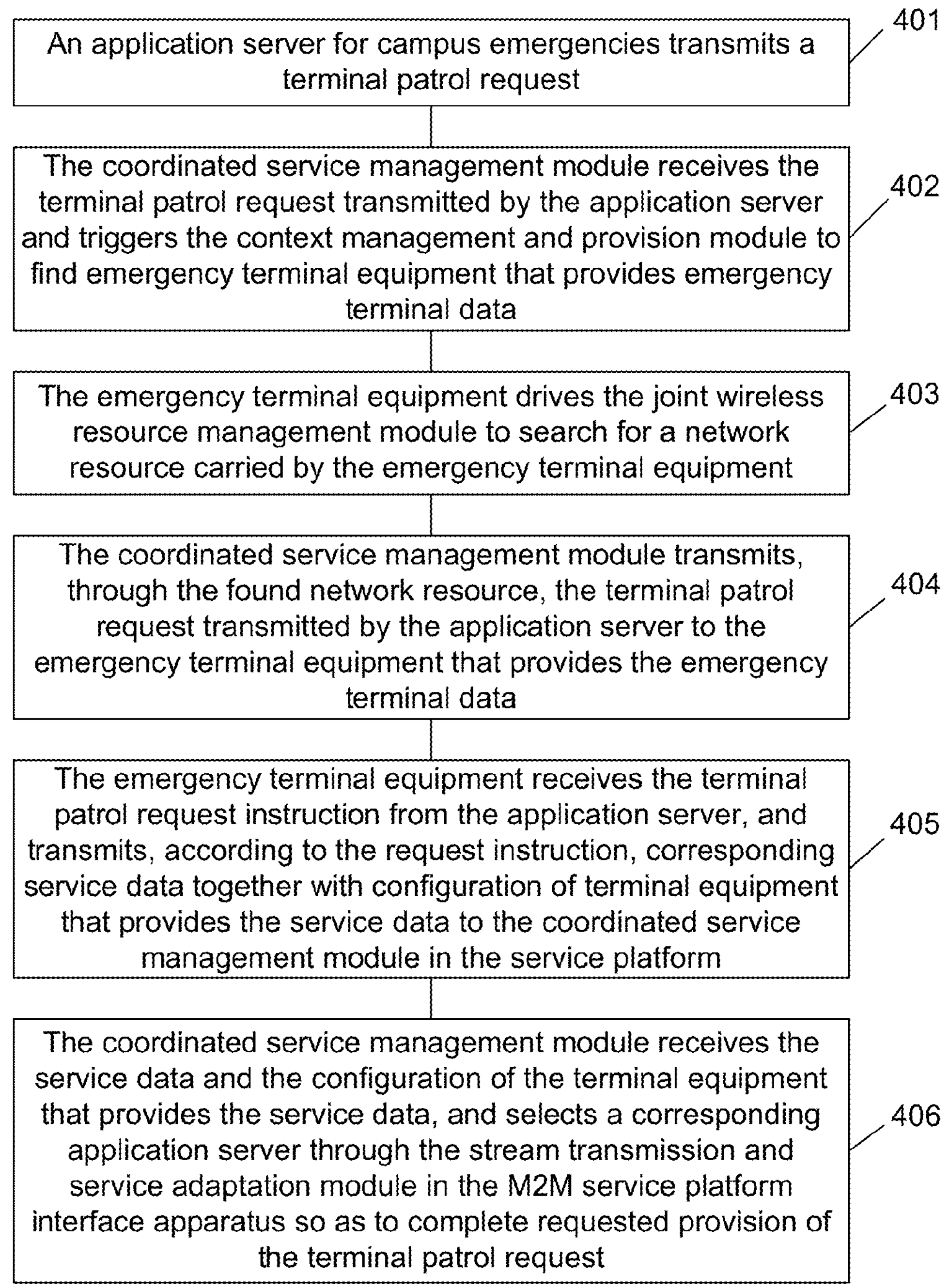
FIG. 4 is a schematic diagram of a processing flow of the first example according to an embodiment of the present disclosure.

An Application Server for Campus Emergencies Detects Emergency Terminal Equipment FIG. 4 is a schematic diagram of a processing flow of the first example according to an embodiment of the present disclosure. The following processing is included as shown in FIG. 4.

Step 401: An application server for campus emergencies transmits a terminal patrol request.

Step 402: The coordinated service management module receives the terminal patrol request transmitted by the application server and triggers the context management and provision module to find emergency terminal equipment that provides emergency terminal data.

Specifically, the coordinated service management module in the M2M service platform interface receives the terminal patrol request transmitted by the application server for campus emergencies and converts a request instruction into a unified data format recognizable by the service platform. The unified data format recognizable by the service platform includes, but is not limited to that provided by an application user or an operator. The converted request instruction triggers the context management and provision module by triggering an event, and the emergency terminal equipment that provides the emergency terminal data is found according to a terminal context information engine provided by the context management and provision module.

Step 403: The emergency terminal equipment drives the joint wireless resource management module to search for a network resource carried by the emergency terminal equipment.

Specifically, after the emergency terminal equipment is found, the joint wireless resource management module may be also driven by triggering an event, so as to find the network resource carried by the emergency terminal equipment.

Step 404: The coordinated service management module transmits, through the found network resource, the terminal patrol request transmitted by the application server to the emergency terminal equipment that provides the emergency terminal data.

The coordinated service management module in the M2M service platform interface transmits the terminal patrol request instruction to the application server for campus emergencies, and converts, according to the found emergency terminal equipment and a carried network resource, the terminal patrol request instruction into a corresponding data format, and transmits, through the found network resource, the data format to the emergency terminal equipment that provides the emergency terminal data, such as a detector, a fire control apparatus, other monitoring apparatus and so on.

Step 405: The emergency terminal equipment receives the terminal patrol request instruction from the application server, and transmits, according to the request instruction, corresponding service data together with configuration of terminal equipment that provides the service data to the coordinated service management module in the service platform.

Step 406: The coordinated service management module receives the service data and the configuration of the terminal equipment that provides the service data, and selects a corresponding application server through the stream transmission and service adaptation module in the M2M service platform interface so as to complete requested provision of the terminal patrol request.

Specifically, after receiving the service data and the configuration of the terminal equipment that provides the service data, the coordinated service management module in the service platform converts the service data and terminal configuration data into a unified data format of the service platform, and selects the corresponding application server, such as the application server for campus emergencies or another application that needs the data, through the stream transmission and service adaptation module in the M2M service platform interface so as to complete the requested provision of the terminal patrol request.

Example 2

Occurrence of Emergency Including a Campus Fire and so on

FIG. 5 is a schematic diagram of a processing flow of the second example according to an embodiment of the present disclosure. The following processing is included as shown in FIG. 5.

Step 501: An application server for campus emergencies transmits an emergency processing request instruction according to detected abnormal data of terminal equipment.

Step 502: The coordinated service management module in the M2M service platform interface receives the emergency processing request instruction transmitted by the application server, and converts the request instruction into a unified recognized data format of the M2M service platform.

Step 503: The context management and provision module is triggered by the processed emergency processing request instruction in the coordinated service management module in a manner of triggering an event, and a corresponding emergency terminal equipment is searched for according to a context index.

Here, the emergency terminal equipment may be various types of emergency terminal equipment including a fire hydrant and so on.

Step 504: The emergency processing request instruction in the coordinated service management module triggers the stream transmission and service adaptation module in the M2M service platform interface apparatus in a manner of triggering an event, and triggers the joint wireless resource management module at the same time.

Step 505: The stream transmission and service adaptation module adapts, according to the found emergency terminal and a wireless resource carried by the emergency terminal, the emergency processing request instruction to a corresponding wireless resource, and transmits the emergency processing request instruction to corresponding emergency terminal equipment through wireless communication.

Step 506: After receiving the emergency processing request instruction transmitted from the service platform, each emergency terminal equipment converts the emergency processing request instruction into an instruction recognizable by the emergency terminal equipment, and performs a corresponding operation to respond to the campus emergency processing request and implement the processing of the emergency.

It needs to be noted that, for service data in different application servers, which is requested by different M2M terminal equipment or user equipment, the modules in the M2M service platform interface apparatus may apply a similar method to process the service data in the application servers, which is requested by the terminal equipment, and select adaptive wireless network resources to transmit the service data to the M2M terminal equipment or the user equipment.

The service platform interface apparatus of the embodiment of the present disclosure can provide some general capabilities and support to the M2M application server so that the M2M application server can access and use network resources and capabilities, and in the meanwhile, the M2M service platform and an M2M application interface can support a service request from the M2M application server and provide configuration information, statistical information, monitoring information and so on of terminal equipment to the M2M application server.

The coordinated service management module, the context management and provision module, the stream transmission and service adaptation module, the joint wireless resource management module and the M2M terminal management module in the service platform interface apparatus provided in the embodiment of the present disclosure may be implemented by a processor on a server carrying an M2M service management platform, and of course, may be also implemented by a specific logic circuit. For example, the processor may be a Central Processing Unit (CPU), a Micro Processor Unit (MPU), a Digital Signal Processor (DSP) or a Field Programmable Gate Array (FPGA) and so on in practical application.

Method Embodiment

An M2M oriented service platform interface method is provided according to an embodiment of the present disclosure and is applied to the M2M oriented service platform interface apparatus in the apparatus embodiment above. FIG. 6 is a flowchart of an M2M oriented service platform interface method according to the embodiment of the present disclosure. As shown in FIG. 6, the M2M oriented service platform interface method according to the embodiment of the present disclosure includes the following processing.

Step 601: The coordinated service management module receives a service request from an application server, invokes the context management and provision module to acquire M2M terminal equipment corresponding to the service request, and invokes the joint wireless resource management module to acquire a wireless resource carried by the M2M terminal equipment.

In Step 601, the process that the coordinated service management module transmits the service request to the corresponding M2M terminal equipment through the wireless resource specifically includes that:

the coordinated service management module invokes the stream transmission and service adaptation module to adapt the service request to a corresponding wireless resource according to the corresponding M2M terminal equipment and the wireless resource carried by the M2M terminal equipment, and transmits the service request to the corresponding M2M terminal equipment through the wireless resource.

Step 602: The coordinated service management module transmits the service request to the corresponding M2M terminal equipment through the wireless resource, receives service data fed back by the corresponding M2M terminal equipment, and invokes the stream transmission and service adaptation module to acquire an application server receiving the service data and transmits the service data to the application server so as to complete the service request.

Preferably, the coordinated service management module manages M2M terminal equipment in a unified manner by invoking the M2M terminal management module in the embodiment of the present disclosure, wherein the process that the M2M terminal management module manages the M2M terminal equipment in the unified manner specifically includes that: the M2M terminal management module performs remote software upgrading, maintenance, and group management on the M2M terminal equipment, and management of group updating caused by mobility of the M2M terminal equipment.

Preferably, the coordinated service management module may convert, according to a requirement, the received service data and the service request into a data format recognizable by the service platform in the embodiment of the present disclosure. Besides, the coordinated service management module may drive, according to the service request of the application server, a corresponding module in the service platform interface apparatus by triggering an event so as to perform coordinated management on the service.

The M2M oriented service platform interface apparatus will be described in details below by taking a campus emergency as an embodiment.

Example 1

An Application Server for Campus Emergencies Detects Emergency Terminal Equipment.

FIG. 4 is a schematic diagram of a processing flow of the first example according to an embodiment of the present disclosure. The following processing is included as shown in FIG. 4.

Step 401: An application server for campus emergencies transmits a terminal patrol request.

Step 402: The coordinated service management module receives the terminal patrol request transmitted by the application server and triggers the context management and provision module to find emergency terminal equipment that provides emergency terminal data.

Specifically, the coordinated service management module in the M2M service platform interface receives the terminal patrol request transmitted by the application server for campus emergencies and converts a request instruction into a unified data format recognizable by the service platform. The unified data format recognizable by the service platform includes, but is not limited to that provided by an application user or an operator. The converted request instruction triggers the context management and provision module by triggering an event, and the emergency terminal equipment that provides the emergency terminal data is found according to a terminal context information engine provided by the context management and provision module.

Step 403: The emergency terminal equipment drives the joint wireless resource management module to search for a network resource carried by the emergency terminal equipment.

Specifically, after the emergency terminal equipment is found, the joint wireless resource management module may be also driven by triggering an event, so as to find the network resource carried by the emergency terminal equipment.

Step 404: The coordinated service management module transmits, through the found network resource, the terminal patrol request transmitted by the application server to the emergency terminal equipment that provides the emergency terminal data.

Specifically, the coordinated service management module in the M2M service platform interface transmits the terminal patrol request instruction to the application server for campus emergencies, and converts, according to the found emergency terminal equipment and a carried network resource, the terminal patrol request instruction into a corresponding data format, and transmits, through the found network resource, the data format to the emergency terminal equipment that provides the emergency terminal data, such as a detector, a fire control apparatus, other monitoring apparatus and so on.

Step 405: The emergency terminal equipment receives the terminal patrol request instruction from the application server, and transmits, according to the request instruction, corresponding service data together with configuration of terminal equipment that provides the service data to the coordinated service management module in the service platform.

Step 406: The coordinated service management module receives the service data and the configuration of the terminal equipment that provides the service data, and selects a corresponding application server through the stream transmission and service adaptation module in the M2M service platform interface apparatus so as to complete requested provision of the terminal patrol request.

Specifically, after receiving the service data and the configuration of the terminal equipment that provides the service data, the coordinated service management module in the service platform converts the service data and terminal configuration data into a unified data format of the service platform, and selects the corresponding application server, such as the application server for campus emergencies or another application that needs the data, through the stream transmission and service adaptation module in the M2M service platform interface apparatus so as to complete the requested provision of the terminal patrol request.

Example 2

Occurrence of Emergency Including a Campus Fire and so on

FIG. 5 is a schematic diagram of a processing flow of the second example according to an embodiment of the present disclosure. The following processing is included as shown in FIG. 5.

Step 501: An application server for campus emergencies transmits an emergency processing request instruction according to detected abnormal data of terminal equipment.

Step 502: The coordinated service management module in the M2M service platform interface receives the emergency processing request instruction transmitted by the application server, and converts the request instruction into a unified recognized data format of the M2M service platform.

Step 503: The context management and provision module is triggered by the processed emergency processing request instruction in the coordinated service management module in a manner of triggering an event, and a corresponding emergency terminal equipment is searched for according to a context index.

Here, the emergency terminal equipment may be various types of emergency terminal equipment including a fire hydrant and so on.

Step 504: The emergency processing request instruction in the coordinated service management module triggers the stream transmission and service adaptation module in the M2M service platform interface apparatus in a manner of triggering an event, and triggers the joint wireless resource management module at the same time.

Step 505: The stream transmission and service adaptation module adapts, according to the found emergency terminal and a wireless resource carried by the emergency terminal, the emergency processing request instruction to a corresponding wireless resource, and transmits the emergency processing request instruction to corresponding emergency terminal equipment through wireless communication.

Step 506: After receiving the emergency processing request instruction transmitted from the service platform, each emergency terminal equipment converts the emergency processing request instruction into an instruction recognizable by the emergency terminal equipment, and performs a corresponding operation to respond to the campus emergency processing request and implement the processing of the emergency.

It needs to be noted that, for service data in different application servers, which is requested by different M2M terminal equipment or user equipment, the modules in the M2M service platform interface apparatus may apply a similar method to process the service data in the application servers, which is requested by the terminal equipment, and select adaptive wireless network resources to transmit the service data to the M2M terminal equipment or the user equipment.

The service platform interface apparatus of the embodiment of the present disclosure can provide some general capabilities and support to the M2M application server so that the M2M application server can access and use network resources and capabilities, and in the meanwhile, the M2M service platform and an M2M application interface can support a service request from the M2M application server and provide configuration information, statistical information, monitoring information and so on of terminal equipment to the M2M application server.

Obviously, those skilled in the art may make various changes and variations to the present disclosure without departing from the spirit and scope of the present disclosure. In this way, the present disclosure also intends to include these changes and variations if these changes and variations of the present disclosure belong to the claims of the present disclosure and the scope of equivalent techniques thereof.

INDUSTRIAL APPLICABILITY

By employing the coordinated service management module, the context management and provision module, the stream transmission and service adaptation module and the joint wireless resource management module, the service platform interface apparatus of the embodiments of the present disclosure can provide some general capabilities and support to an M2M application server so that the M2M application server can access and use network resources and capabilities, and in the meanwhile, an M2M service platform and an M2M application interface can support a service request from the M2M application server and provide configuration information, statistical information, monitoring information and so on of terminal equipment to the M2M application server.

What is claimed is:

1. A Machine-to-Machine (M2M) oriented service platform interface apparatus, connected to an application server and connected with M2M terminal equipment by a network, the apparatus comprising:

a processor; and a memory for storing instructions executable by the processor;

wherein the processor is configured to: forward service data and a service request from the application server and forward service data from the M2M terminal equipment, perform management, adaptation, and provision on service data, and perform coordinated management on a service according to the service request of the application server;

manage and provide network context information, M2M terminal equipment context information and user context information;

perform a traffic distribution operation on the service according to a user service type, the user context information, the network context information, and/or the M2M terminal equipment context information, adapt the service to different M2M terminal equipment and networks, provide service data that a user needs, and perform corresponding service adaptation upon different user demands;

perform unified scheduling and adaptation on wireless network resources carried by the M2M terminal equipment, store and update location information of the M2M terminal equipment, and perform adaptation and scheduling on the wireless network resources according to service context information, the M2M terminal equipment context information, and network loads, so as to complete transmission and information interaction of a service stream; and manage the M2M terminal equipment in a unified manner.

2. The apparatus according to claim 1, wherein the processor is further configured to perform remote software upgrading, maintenance, and group management on the M2M terminal equipment, and perform management of group updating caused by mobility of the M2M terminal equipment.

3. The apparatus according to claim 1, wherein the processor is further configured to convert the received service data and the service request into a data format recognizable by a service platform.

4. The apparatus according to claim 1, wherein the processor is further configured to drive, according to the service request of the application server, the service platform interface apparatus by triggering an event, so as to perform coordinated management on the service.

5. A Machine-to-Machine (M2M) oriented service platform interface method, applied to an M2M oriented service platform interface apparatus, the method comprising:

receiving a service request from an application server, triggering a context management and provision module to acquire M2M terminal equipment corresponding to the service request, and triggering a joint wireless resource management module to acquire a wireless network resource carried by the M2M terminal equipment, by a coordinated service management module;

transmitting the service request to the corresponding M2M terminal equipment through the wireless network resource, receiving service data fed back by the corresponding M2M terminal equipment, and triggering a stream transmission and service adaptation module to acquire an application server receiving the service data and transmitting the service data to the application server so as to complete the service request, by the coordinated service management module; and managing, by the coordinated service management module, the M2M terminal equipment in a unified manner by triggering an M2M terminal management module in the M2M oriented service platform interface apparatus;

wherein the M2M oriented service platform interface apparatus comprises the coordinated service management module, the context management and provision module, the stream transmission and service adaptation module, and the joint wireless resource management module.

6. The method according to claim 5, wherein managing, by the M2M terminal management module, the M2M terminal equipment in the unified manner comprises:

performing, by the M2M terminal management module, remote software upgrading, maintenance, and group management on the M2M terminal equipment, and performing management of group updating caused by mobility of the M2M terminal equipment.

7. The method according to claim 5, wherein transmitting, by the coordinated service management module, the service request to the corresponding M2M terminal equipment through the wireless network resource comprises:

triggering the stream transmission and service adaptation module to adapt the service request to a corresponding wireless resource according to the corresponding M2M terminal equipment and the wireless network resource carried by the M2M terminal equipment, and transmitting the service request to the corresponding M2M terminal equipment through the wireless network resource, by the coordinated service management module.

8. The method according to claim 5, further comprising:

converting, by the coordinated service management module, the received service data and the service request into a data format recognizable by a service platform.

* * * * *